United States Patent
Lu et al.

(10) Patent No.: US 8,358,739 B2
(45) Date of Patent: Jan. 22, 2013

(54) SYSTEMS AND METHODS FOR TEMPORAL MULTIPLEXING X-RAY IMAGING

(75) Inventors: Jianping Lu, Chapel Hill, NC (US);
Otto Zhou, Chapel Hill, NC (US);
Guohua Cao, Chapel Hill, NC (US);
Jian Zhang, Durham, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 323 days.

(21) Appl. No.: 12/875,260

(22) Filed: Sep. 3, 2010

(65) Prior Publication Data
US 2012/0057678 A1    Mar. 8, 2012

(51) Int. Cl.
*H05G 1/64* (2006.01)
(52) U.S. Cl. .................................. 378/98; 378/8
(58) Field of Classification Search ............ 378/62, 378/95, 98, 98.11, 98.12, 4, 8
See application file for complete search history.

(56) References Cited

U.S. PATENT DOCUMENTS

| | | |
|---|---|---|
| 2,842,706 A | 7/1958 | Dobischek et al. |
| 3,617,285 A | 11/1971 | Staudenmayer |
| 3,733,484 A | 5/1973 | Bayard |
| 3,753,020 A | 8/1973 | Zingaro |
| 3,783,288 A | 1/1974 | Barbour et al. |
| 3,921,022 A | 11/1975 | Levine |
| 3,932,756 A | 1/1976 | Cowell et al. |
| 4,012,656 A | 3/1977 | Norman et al. |
| 4,145,614 A | 3/1979 | Kowalski |
| 4,253,221 A | 3/1981 | Cochran, Jr. et al. |
| 4,289,969 A | 9/1981 | Cooperstein et al. |
| 4,382,184 A | 5/1983 | Wernikoff |
| 4,712,226 A | 12/1987 | Horbaschek |
| 4,780,612 A | 10/1988 | Klatt |
| 4,809,308 A | 2/1989 | Adams et al. |
| 4,926,452 A | 5/1990 | Baker et al. |

(Continued)

FOREIGN PATENT DOCUMENTS
CN   2336381 Y   9/1999
(Continued)

OTHER PUBLICATIONS

Japanese Office Action for JP Appl. No. 2008-532428 dated Sep. 6, 2011.

(Continued)

*Primary Examiner* — Hoon Song
(74) *Attorney, Agent, or Firm* — Jenkins, Wilson, Taylor & Hunt, P.A.

(57) ABSTRACT

The present subject matter relates to systems and methods for temporal multiplexing x-ray imaging of dynamic objects with high temporal resolution and fast imaging speed. A pulsed x-ray beam can irradiate an object undergoing a range of motion such as a cyclic motion. Multiple x-ray images can be acquired at different phases within a single motion cycle or range of the object. The multiple x-ray images can be demultiplexed to produce an individual phase image. Compared to sequential imaging, temporal multiplexing x-ray imaging can achieve high temporal resolution of dynamics object in multiple phases with imaging time comparable to that of a single phase. Temporal multiplexing x-ray imaging can thus be applied to a wide variety of applications, including biomedical imaging and industrial non-destructive testing.

17 Claims, 4 Drawing Sheets

U.S. PATENT DOCUMENTS

| | | |
|---|---|---|
| 4,958,365 A | 9/1990 | Sohval et al. |
| 5,129,850 A | 7/1992 | Kane et al. |
| 5,138,237 A | 8/1992 | Kane et al. |
| 5,245,648 A | 9/1993 | Kinney et al. |
| 5,305,363 A | 4/1994 | Burke et al. |
| 5,371,778 A | 12/1994 | Yanof et al. |
| 5,377,249 A | 12/1994 | Wiesent et al. |
| 5,390,112 A | 2/1995 | Tam |
| 5,412,703 A | 5/1995 | Goodenough et al. |
| 5,424,054 A | 6/1995 | Bethune et al. |
| 5,557,105 A | 9/1996 | Honjo et al. |
| 5,578,821 A | 11/1996 | Meisberger et al. |
| 5,594,770 A | 1/1997 | Bowles et al. |
| 5,616,368 A | 4/1997 | Jin et al. |
| 5,623,180 A | 4/1997 | Jin et al. |
| 5,637,950 A | 6/1997 | Jin et al. |
| 5,648,699 A | 7/1997 | Jin et al. |
| 5,692,028 A | 11/1997 | Geus et al. |
| 5,726,524 A | 3/1998 | Debe |
| 5,745,437 A | 4/1998 | Wachter et al. |
| 5,764,683 A | 6/1998 | Swift et al. |
| 5,773,834 A | 6/1998 | Yamamoto et al. |
| 5,773,921 A | 6/1998 | Keesman et al. |
| 5,834,783 A | 11/1998 | Muraki et al. |
| 5,844,963 A | 12/1998 | Koller et al. |
| 5,910,974 A | 6/1999 | Kuhn et al. |
| 5,973,444 A | 10/1999 | Xu et al. |
| RE36,415 E | 11/1999 | McKenna |
| 5,976,444 A | 11/1999 | Pearson et al. |
| 6,019,656 A | 2/2000 | Park et al. |
| 6,028,911 A | 2/2000 | Kawahara |
| 6,057,637 A | 5/2000 | Zettl et al. |
| 6,087,765 A | 7/2000 | Coll et al. |
| 6,097,138 A | 8/2000 | Nakamoto |
| 6,097,788 A | 8/2000 | Berenstein et al. |
| 6,125,167 A | 9/2000 | Morgan |
| 6,178,226 B1 | 1/2001 | Hell et al. |
| 6,192,104 B1 | 2/2001 | Adams et al. |
| 6,250,984 B1 | 6/2001 | Jin et al. |
| 6,259,765 B1 | 7/2001 | Baptist |
| 6,271,923 B1 | 8/2001 | Hill |
| 6,277,318 B1 | 8/2001 | Bower et al. |
| 6,280,697 B1 | 8/2001 | Zhou et al. |
| 6,297,592 B1 | 10/2001 | Goren et al. |
| 6,333,968 B1 | 12/2001 | Whitlock et al. |
| 6,334,939 B1 | 1/2002 | Zhou et al. |
| 6,350,628 B1 | 2/2002 | Cheng et al. |
| 6,376,973 B1 | 4/2002 | Blanchet-Fincher et al. |
| 6,385,292 B1 | 5/2002 | Dunham et al. |
| 6,440,761 B1 | 8/2002 | Choi |
| 6,445,122 B1 | 9/2002 | Chuang et al. |
| 6,456,691 B2 | 9/2002 | Takahashi et al. |
| 6,459,767 B1 | 10/2002 | Boyer |
| 6,470,068 B2 | 10/2002 | Cheng |
| 6,498,349 B1 | 12/2002 | Thomas et al. |
| 6,510,195 B1 | 1/2003 | Chappo et al. |
| 6,529,575 B1 | 3/2003 | Hsieh |
| 6,545,396 B1 | 4/2003 | Ohki et al. |
| 6,553,096 B1 | 4/2003 | Zhou et al. |
| 6,560,309 B1 | 5/2003 | Becker et al. |
| RE38,223 E | 8/2003 | Keesmann et al. |
| 6,621,887 B2 | 9/2003 | Albagli et al. |
| 6,630,772 B1 | 10/2003 | Bower et al. |
| 6,650,730 B2 | 11/2003 | Bogatu et al. |
| 6,672,926 B2 | 1/2004 | Liu et al. |
| 6,674,837 B1 | 1/2004 | Taskar et al. |
| 6,754,300 B2 | 6/2004 | Hsieh et al. |
| 6,760,407 B2 | 7/2004 | Price et al. |
| RE38,561 E | 8/2004 | Keesmann et al. |
| 6,787,122 B2 | 9/2004 | Zhou |
| 6,850,595 B2 | 2/2005 | Zhou et al. |
| 6,852,973 B2 | 2/2005 | Suzuki et al. |
| 6,876,724 B2 | 4/2005 | Zhou et al. |
| 6,950,493 B2 | 9/2005 | Besson |
| 6,965,199 B2 | 11/2005 | Stoner et al. |
| 6,980,627 B2 | 12/2005 | Qiu et al. |
| 7,027,558 B2 | 4/2006 | Ghelmansarai et al. |
| 7,046,757 B1 | 5/2006 | Bani-Hashemi et al. |
| 7,082,182 B2 | 7/2006 | Zhou et al. |
| 7,085,351 B2 | 8/2006 | Lu et al. |
| 7,147,894 B2 | 12/2006 | Zhou et al. |
| 7,220,971 B1 | 5/2007 | Chang et al. |
| 7,227,924 B2 | 6/2007 | Zhou et al. |
| 7,245,692 B2 | 7/2007 | Lu et al. |
| 7,359,484 B2 | 4/2008 | Qiu et al. |
| 7,420,174 B2 | 9/2008 | Kurita et al. |
| 7,486,772 B2 * | 2/2009 | Lu et al. ............ 378/87 |
| 7,684,537 B2 * | 3/2010 | Imai et al. ............ 378/8 |
| 7,741,624 B1 | 6/2010 | Sahadevan |
| 7,751,528 B2 | 7/2010 | Zhou et al. |
| 7,835,492 B1 | 11/2010 | Sahadevan |
| 7,902,530 B1 | 3/2011 | Sahadevan |
| 8,155,262 B2 | 4/2012 | Zhou et al. |
| 8,189,893 B2 | 5/2012 | Zhang et al. |
| 2001/0019601 A1 | 9/2001 | Tkahashi et al. |
| 2002/0085674 A1 | 7/2002 | Price et al. |
| 2002/0094064 A1 | 7/2002 | Zhou et al. |
| 2002/0110996 A1 | 8/2002 | Yaniv et al. |
| 2002/0140336 A1 | 10/2002 | Stoner et al. |
| 2002/0159565 A1 | 10/2002 | Muller et al. |
| 2002/0171357 A1 | 11/2002 | Sun et al. |
| 2002/0191751 A1 | 12/2002 | Bogatu et al. |
| 2002/0193040 A1 | 12/2002 | Zhou |
| 2003/0002627 A1 | 1/2003 | Espinosa et al. |
| 2003/0002628 A1 | 1/2003 | Wilson et al. |
| 2003/0048868 A1 | 3/2003 | Bailey et al. |
| 2003/0102222 A1 | 6/2003 | Zhou et al. |
| 2003/0103666 A1 | 6/2003 | Edic et al. |
| 2003/0142790 A1 | 7/2003 | Zhou et al. |
| 2003/0198318 A1 | 10/2003 | Price et al. |
| 2004/0017888 A1 | 1/2004 | Seppi et al. |
| 2004/0036402 A1 | 2/2004 | Keesmann et al. |
| 2004/0065465 A1 | 4/2004 | Chappo et al. |
| 2004/0108298 A1 | 6/2004 | Gao |
| 2004/0114721 A1 | 6/2004 | Qiu et al. |
| 2004/0213378 A1 | 10/2004 | Zhou et al. |
| 2004/0240616 A1 | 12/2004 | Qiu et al. |
| 2004/0256975 A1 | 12/2004 | Gao et al. |
| 2005/0028554 A1 | 2/2005 | Wanner et al. |
| 2005/0084073 A1 | 4/2005 | Seppi et al. |
| 2005/0117701 A1 | 6/2005 | Nelson et al. |
| 2005/0133372 A1 | 6/2005 | Zhou et al. |
| 2005/0175151 A1 | 8/2005 | Dunham et al. |
| 2005/0226361 A1 | 10/2005 | Zhou et al. |
| 2005/0226371 A1 | 10/2005 | Kautzer et al. |
| 2005/0269559 A1 | 12/2005 | Zhou et al. |
| 2006/0018432 A1 | 1/2006 | Zhou et al. |
| 2006/0291711 A1 | 12/2006 | Jabri et al. |
| 2007/0009081 A1 | 1/2007 | Zhou et al. |
| 2008/0031400 A1 | 2/2008 | Beaulieu et al. |
| 2008/0069420 A1 | 3/2008 | Zhang et al. |
| 2010/0239064 A1 | 9/2010 | Zhou et al. |
| 2010/0329413 A1 | 12/2010 | Zhou et al. |

FOREIGN PATENT DOCUMENTS

| | | |
|---|---|---|
| CN | ZL200680013859 | 1/2011 |
| CN | ZL200810215733 | 10/2011 |
| DE | 197 00 992 | 7/1998 |
| DE | 101 64 315 A1 | 8/2002 |
| DE | 101 64 318 A1 | 8/2002 |
| EP | 0 268 488 | 5/1988 |
| EP | 1 050 272 A1 | 11/2000 |
| EP | 0 648 468 | 4/2005 |
| GB | 679617 | 9/1952 |
| JP | 53103392 A | 9/1978 |
| JP | S54-027793 | 3/1979 |
| JP | 57162431 A2 | 10/1982 |
| JP | 60254615 A2 | 12/1985 |
| JP | S61-142644 | 6/1986 |
| JP | 06163381 A2 | 6/1994 |
| JP | 09180894 A | 7/1997 |
| JP | 2000251826 A2 | 2/1999 |
| JP | 11-111158 | 4/1999 |
| JP | H11-116218 | 4/1999 |
| JP | 11-260244 | 9/1999 |
| JP | 08264139 A | 10/1999 |
| JP | 2000208028 | 7/2000 |

| | | |
|---|---|---|
| JP | 2001-048509 | 2/2001 |
| JP | 2001190550 A | 7/2001 |
| JP | A2001250496 A | 9/2001 |
| JP | 2003100242 A | 4/2003 |
| TW | 00319886 | 11/1997 |
| TW | 0379354 B | 1/2000 |
| TW | 0439303 B | 6/2001 |
| TW | 0527624 B | 4/2003 |
| TW | 0529050 B | 4/2003 |
| WO | WO 00/51936 A3 | 9/2000 |
| WO | WO 02/03413 | 1/2002 |
| WO | WO 02/31857 | 4/2002 |
| WO | WO 03/012816 A2 | 2/2003 |
| WO | WO 2004/061477 | 7/2004 |
| WO | WO 2004/096050 | 11/2004 |
| WO | WO 2004/097889 | 11/2004 |
| WO | WO 2005/079246 | 1/2005 |

OTHER PUBLICATIONS

Non-Final Office Action for U.S. Appl. No. 11/441,281 dated Oct. 19, 2011.
European Search Report for EP 06815214 dated Oct. 25, 2011.
Notice of Allowance for U.S. Appl. No. 11/526,217 dated Dec. 14, 2011.
Notice of Allowance for U.S. Appl. No. 11/804,897 dated Jan. 6, 2012.
Third Office Action for CN Appl. No. 2006-80043786.9 dated Feb. 2, 2012.
Reexamination Notice for CN Appl No. 200710003710.X dated Sep. 21, 2011.
Second Reexamination Notice for CN Appl No. 200710003710.X dated Mar. 2012.
Bentley, M.D. et al., "The Use of Microcomputed Tomography to Study Microvasculature in Small Rodents", *Am. J Physiol Regulatory Integrative Comp Physiol*, 282, pp. R1267-1279, 2002.
Bonard et al., "Field emission from single-wall carbon nanotube films", *Appl. Phys. Left.*, vol. 73, No. 7, pp. 918-920 (Aug. 17, 1998).
Bower et al., "Synthesis and structure of pristine and alkali-metal-intercalated single-walled carbon nanotubes", *Appl. Phys.*, A 67, pp. 47-52 (1998).
Bower, C. et al., "Fabrication and Field Emission Properties of Carbon Nanotube Cathodes", *Mat. Res. Soc. Symp. Proc.*, vol. 593, pp. 215-220, 2000.
Brock et al., "Hadamard Transform Time-of-Flight Mass Spectrometry," Analytical Chemistry, vol. 70, No. 18, Sep. 15, 1998.
Brodie et al., "Vacuum Microelectronics", *Advance in Electronics and Electron Physics*, edited by P.W. Hawkes, vol. 83, pp. 1-106 (1992).
Bushong, S.C., "Radiologic Science for Technologist," Physics, Biology, and Protection, 6th Edition, Mosby, Inc., 1997 (excerpt relating to focusing and thermionic emission).
Cassell et al., "Large Scale CVD Synthesis of Single-Walled Carbon Nanotubes", *J. Phys. Chem.*, B 103, pp. 6484-6492 (Jul. 20, 1999).
Charbonnier et al., "Resolution of Field-Emmision X-Ray Sources," *Radiology*, vol. 117: pp. 165-172 (Oct. 1975).
Cheng et al., "Dynamic radiography using a carbon-nanotube-based field emmision x-ray source," *Review of Scientific Instruments*, vol. 75, No. 10: pp. 3264-3267 (Oct. 2004).
Cheng et al., "Electron Field Emission from Carbon Nanotubes," *C.R. Physique*, pp. 1021-1033 (2003).
de Heer et al., "A Carbon Nanotube Field-Emission Electron Source", *Science*, vol. 270, pp. 1179-1180 (Nov. 17, 1995).
Dobbins III et al., "Digital x-ray tomosynthesis: current state of the art and clinical potential," *Phys. Med. Biol.* 48 (2003) R65-R106.
Feldkamp L.A. et al., "Practical Cone-Beam Algorithm", *J. Opt. Soc. Am.*, 1(a):612-619, 1984.
Gao et al., "Fabrication and Electron Field Emmision Properties of Carbon Nanotube Films by Electrophoretic Deposition," *Advanced Materials*, vol. 13, No. 23 (2001).
Geis et al., "Diamond emitters fabrication and theory", *J. Vac. Sci. Technol. B*, vol. 14, No. 3, pp. 2060-2067, May/Jun. 1996.
Hallenbeck, "Clinical Evaluation of the 350-kV Chest Radiography System," *Radiology*, vol. 117: pp. 1-4 (1974).

Hu, J. et al., "Chemistry and Physics in One Dimension: Synthesis and Properties of Nanowires and Nanotubes", *Accounts of Chemical Research*, vol. 32, pp. 435-445, 1999.
Jerri, "The Shannon Sampling Theorem—Its Various Extensions and Applications: A Tutorial Review," *IEEE*, vol. 65, No. 11, pp. 1565-1596 (1977).
Journet et al., "Large-scale production of single-walled carbon nanotubes by the electric-arc technique", *Nature*, vol. 388, pp. 756-760 (Aug. 21, 1997).
Kruger et al., "Tomosynthesis Applied to Digital Subtraction Angiography," *Radiology*, V152, pp. 805-808 (1984).
Kumar et al., "Diamond-based field emission flat panel displays", *Solid State Technology*, vol. 38, pp. 71-74 (May 1995).
Lalush, "Feasibility of Transmission Micro-CT with Two Fan-Beam Sources," *Proceedings of 26th Annual Int'l Conf on IEEE EMBS*, pp. 1283-1286, Sep. 5, 2004.
Lee et al., "Novel Micro-CT Based on a Carbon Nanotube Field Emission X-ray Source," *2003 Radiological Society of North American Meeting*, Abstract Code A21-182, Nov. 30, 2003.
Lee et al., "Pulsed X-Ray Imaging of Small Animals Using a Carbon Nanotube Based X-Ray Source" presented at the Academy of Molecular Imaging Annual Meeting, Orlando, FL, Molecular Imaging and Biology, vol. 6, No. 2, Abstract No. 41, p. 80 (Mar. 2004).
Moore et al., "Three-Dimensional X-Ray Laminography as a Tool for Detection and Characterization of BGA Package Defects", IEEE Transactions on Components and Packaging Technologies. vol. 25, No. 2, Jun. 2002.
Nyquist, "Certain Topics in Telegraphic Transmission Theory," *IEEE*, vol. 2, No. 2, pp. 208-305 (2002).
Okano et al., "Electron emission from nitrogen-doped pyramidal-shape diamond and its battery operation", *Appl. Phys. Lett.*, vol. 70, No. 16, pp. 2201-2203 (Apr. 21, 1997).
Okano et al., "Fabrication of a diamond field emitter array", *Appl. Phys. Lett.*, vol. 64, No. 20, pp. 2742-2744 (May 16, 1994).
Okazaki et al., "A New Emission Spectrum of $Au_2$ in the Gas Evaporation Technique: 761-809 nm", *Jpn. J. Appl. Phys.*, vol. 37, Pt. 1, No. 1, pp. 349-350 (Jan. 1998).
Resat et al., "Microbeam developments and applications: A low linear energy transfer perspective," Cancer and Metastasis Reviews 23: p. 323-331 (2004).
Ribbing et al., "Diamond membrane based sructures for miniature X-ray sources," Diamond and Related Materials, vol. 11: pp. 1-7 (2002).
Rinzler et al., "Unraveling Nanotubes: Field Emission from an Atomic Wire", *Science*, vol. 269, pp. 1550-1553 (Sep. 15, 1995).
Saito, Y. et al., "Field Emission Patterns from Single-Walled Carbon Nanotubes", *Jpn. J. Appl. Phys.*, vol. 36, pp. L1340-L1342, Part 2, No. 10A, Oct. 1, 1997.
Saito, Y. et al., "Cathode Ray Tube Lighting Elements with Carbon Nanotube Field Emitters", *Jpn. J. Appl. Phys.*, vol. 37, pp. L346-L348, Part 2, No. 3B, Mar. 15, 1998.
Shannon, "Communication in the Presence of Noise," *IEEE*, vol. 86, No. 2, pp. 447-108 (1998).
Sloane, "Multiplexing Methods in Spectroscopy," Mathematics Magazine, vol. 52, No. 2 (Mar. 1979), 71-80.
Sugie et al., "Carbon nanotubes as electron source in an x-ray tube," Applied Physics Letters, vol. 78, No. 17: pp. 2578-2580 (2001).
Tang, X. P. et al., "Electronic Structures of Single-Walled Carbon Nanotubes Determined by NMR", *Science*, vol. 288, pp. 492-494 (Apr. 21, 2000).
Thess, A. et al., "Crystalline Ropes of Metallic Carbon Nanotubes", *Science*, vol. 273, pp. 483-487 (Jul. 26, 1996).
Traedo, "A Thousand Points of Light: The Hadamard Transform in Chemical Analysis and Instrumentation," Analytical Chemistry. vol. 61, No. 11, Jun. 1, 1989.
Vogel et al., "A New Method of Multiplanar Emission Tomography Using a Seven Pinhole Collimator and an Anger Scintillation Camera," *Jour. Nuclear Medicine*, vol. 19, No. 6, pp. 648-654, 1978.
Wang et al., "Field Emission From Nanotube Bundle Emitters at Low Fields", *App. Phys. Lett.*, 70(24), pp. 3308-3310, Jun. 16, 1997.
Wang et al., "A nanotube-based field-emission flat panel display", *Appl. Phys. Lett.*, vol. 72, No. 2, pp. 2912-2913 (Jun. 1, 1998).

Weinstein et al., "Data Transmission by Frequency-Division Multiplexing Using the Discrete Fourier Transform," IEEE Trans. on Commun. Tech., vol. Com-19, No. 5, pp. 628-634, Oct. 1971.
Weisstein, "CRC Concise Encyclopedia of Mathematics," Second Ed., pp. 1, 54, 1092-1097, 1936, 2046 and 2615 (2003).
Yagishita et al., "Effects of Cleavage on Local Cross-Sectional Stress Distribution in Trench Isolation Structure", *Jpn. J. Appl. Phys.*, vol. 36, pp. 1335-1340 (Mar. 1997).
Yue et al., "Generation of continuous and pulsed diagnostic imaging x-ray radiation using a carbon nontube based field emission cathode," Applied Physics Letters, vol. 81, No. 2: pp. 355-357 (F) Jul. 8, 2002.
Zhang et al., "Multiplexing radiography using a carbon nanotube based x-ray source," Applied Physics Letters, vol. 89, 2006.
Zhang et al., "Stationary scanning x-ray source based on carbon nanotube field emitters," Applied Physics Letters, vol. 86, 2005.
Zhou et al., "Materials Science of Carbon Nanotubes: Fabrication, Integration, and Properties of Macroscopic Structures of Carbon Nanotubes", *Acc. Chem. Res.*, vol. 35, pp. 1045-1053, 2002.
Zhu et al., "Low-Field Electron Emission from Updoped Nanostructured Diamond", *Science*, vol. 282, 1471-1473 (Nov. 20, 1998).
Zhu, W. et al., "Large Current Density from Carbon Nanotube Filed Emitters", *Appl. Phys. Lett.*, American Institute of Physics, vol. 75, No. 6, Aug. 9, 1999, pp. 873-875.
Non-final Office Action for U.S. Appl. No. 09/679,303 dated Jan. 16, 2002.
Final Office Action for U.S. Appl. No. 09/679,303 dated May 6, 2002.
Non-final Office Action. For U.S. Appl. No. 09/679,303 dated Aug. 20, 2002.
Notice of Allowance for U.S. Appl. No. 09/679,303 dated Nov. 1, 2002.
Office Communication for U.S. Appl. No. 09/679,303 dated Feb. 6, 2003.
International Search Report for Application No. PCT/US03/00537 dated Apr. 10, 2003.
Non-final Office Action for U.S. Appl. No. 10/309,126 dated May 22, 2003.
Non-final Office Action for U.S. Appl. No. 10/051,183 dated Sep. 10, 2003.
Non-final Office Action for U.S. Appl. No. 10/309,126 dated Nov. 5, 2003.
Non-final Office Action for U.S. Appl. No. 10/309,126 dated Apr. 20, 2004.
Non-final Office Action for U.S. Appl. No. 10/051,183 dated Apr. 21, 2004.
Notice of Allowance for U.S. Appl. No. 10/309,126 dated Aug. 26, 2004.
Notice of Allowance for U.S. Appl. No. 10/051,183 dated Aug. 31, 2004.
Corrected Notice of Allowance for U.S. Appl. No. 10/309,126 dated Sep. 14, 2004.
Non-final Office Action for U.S. Appl. No. 10/358,160 dated Sep. 21, 2004.
Office Communication for U.S. Appl. No. 10/051,183 dated Jan. 14, 2005.
International Search Report and Written Opinion for PCT/US04/12660 dated Apr. 7, 2005.
Non-final Office Action U.S. Appl. No. 10/358,160 dated Jun. 7, 2005.
Office Action-Restriction requirement U.S. Appl. No. 10/358,160 dated Oct. 26, 2005.
Notice of Allowance U.S. Appl. No. 10/358,160 dated Feb. 8, 2006.
International Search Report and Written Opinion for Application No. PCT/US05/03991 dated Jun. 22, 2006 / Aug. 14, 2006.
Non-Final Office Action for U.S. Appl. No. 11/320,515 dated Aug. 17, 2006.
Office Action-Restriction requirement for U.S. Appl. No. 11/051,332 dated Sep. 7, 2006.
International Search Report for corresponding International Application No. PCT/US05/47066 dated Oct. 6, 2006.
Notice of Allowance dated for U.S. Appl. No. 11/051,332 dated Dec. 28, 2006.
International Preliminary Report on Patentability for PCT/US04/12660 dated May 9, 2007.
International Search Report for PCT/US06/37046 dated May 21, 2007.
Korean Intellectual Property Office (KIPO) Office Action for Korean Patent Application No. 10-2004-7011373 dated Jun. 11, 2007.
European Patent Office Examination Report dated Jun. 28, 2007 for European Patent Application No. 03702044.3.
Korean Intellectual Property Office (KIPO) Office Action for Korean Patent Application No. 10-2003-700004987 dated Jul. 19, 2007.
Second Chinese Office Action for Patent Application No. 03806739.0 dated Oct. 19, 2007.
Non-final Office Action for U.S. Appl. No. 11/415,953 dated Dec. 11, 2007.
Korean Office Action for Korean Patent Application No. 10-2004-7011373 dated Dec. 18, 2007.
Taiwanese Office Action for Taiwan Patent No. 093102622 dated Dec. 21, 2007.
Examination Report from European Patent Office dated Mar. 3, 2008 for European Patent Application No. 03702044.3.
Third Chinese Office Action dated Mar. 14, 2008 for Chinese Patent Application No. 01820211.X (PCT/U801/30027).
Non-final Office Action for U.S. Appl. No. 10/970,384 dated Apr. 8, 2008.
Office Action-Restriction requirement for U.S. Appl. No. 11/415,953 dated May 22, 2008.
Office Action from Canadian Patent Office dated May 27, 2008 for Canadian Application No. 2,424,826.
Japanese Patent Office Action for JP No. 2003-562962 for corresponding PCT No. US03/00537 dated Jun. 20, 2008.
International Search Report and Written Opinion for PCT Application No. PCT/US08/70477 dated Oct. 1, 2008.
First Office Action from Japanese Patent Office for Japanese Patent Application No. 2002-535152, based on PCT/US01/30027 dated Oct. 17, 2008.
First Office Action from Japanese Patent Office dated Jan. 6, 2009 for JP Application No. 2006-513282.
Notice of Publication for Chinese Patent Application No. 200810215733.1 (Publication No. 101352353) dated Jan. 28, 2009.
Confirmation of issuance of Chinese Patent No. ZL01820211.X corresponding to PCT/US01/30027 dated Feb. 4, 2009.
Confirmation that Chinese Application 093102622 issued on Mar. 1, 2009 as Patent No. TW I307110.
First Office Action from Chinese Patent Office dated Mar. 6, 2009 for Chinese Patent Application No. 200480017120.7.
Japanese Final Office Action for Japanese Patent Application No. 2003-562962 based on PCT/US03/00537 dated Mar. 30, 2009.
First Office Action from Chinese Patent Office for Chinese Patent Application No. 200710003710.X dated Apr. 24, 2009.
Office Action-Final for U.S. Appl. No. 11/441,281 dated Jun. 4, 2009.
Supplementary European Search Report for European Patent Application No. 01981327.8 dated Jun. 22, 2009.
Non-Final Office Action for U.S. Appl. No. 12/176,056 dated Sep. 2, 2009.
First Office Action from Chinese Patent Office for Chinese Patent Application Serial No. 200680013859.X dated Sep. 25, 2009.
Supplementary European Search report dated Oct. 7, 2009 for EPO Application No. 04 77 5902 (PCT/US2004012660).
Second Office Action from Japanese Patent Office dated Dec. 7, 2009 for Japanese Patent Application No. 2002-535152.
Decision on Rejection issued from the Chinese Patent Office dated Dec. 11, 2009 for Chinese Application No. 200710003710.X.
U.S. Appl. No. 12/655,825, filed Jan. 7, 2010 entitled "System and Method for All Field Simultaneous Radiation Therapy and Concealed Object Screening . . . ".
Non-final Office Action for U.S. Appl. No. 11/441,281 dated Jan. 11, 2010.
Second Office Action corresponding to Chinese Patent Application No. 200680013859 dated Apr. 30, 2010.
First Office Action corresponding to Chinese Patent Application. No. 200680043786.9 dated Jul. 6, 2010.
Final Office Action for U.S. Appl. No. 11/441,281 dated Sep. 30, 2010.

Non-Final Office Action for U.S. Appl. No. 11/526,217 dated Oct. 13, 2010.
Non-Final Office Action for U.S. Appl. No. 11/804,897 dated Nov. 8, 2010.
Second Office Action for CN Appl. No. 2004-80017120.7 dated Nov. 17, 2010.
Third Office Action for CN Appl. No. 2008-10215733.1 dated Dec. 14, 2010.
Third-Party Submission against U.S. Appl. No. 12/688,425 dated Feb. 28, 2011.
Second Office Action for CN Appl. No. 2006-80043786.9 dated Mar. 2, 2011.
Non-Final Office Action for U.S. Appl. No. 11/441,281 dated Mar. 15, 2011.
First Office Action for CN Appl. No. 200880107680.X dated Apr. 7, 2011.
Final Office Action for U.S. Appl. No. 11/526,217 dated May 6, 2011.
Notification to Grant for Chinese Patent Application No. 200810215733.1 dated Jun. 2, 2011.
Notification to Grant for Chinese Patent Application No. 200480017120.7 dated Jul. 12, 2011.
Final Office Action for U.S. Appl. No. 11/804,897 dated Jul. 14, 2011.
Final Office Action for U.S. Appl. No. 11/526,217 dated Aug. 19, 2011.

* cited by examiner

SYSTEMS AND METHODS FOR TEMPORAL MULTIPLEXING X-RAY IMAGING

GOVERNMENT INTEREST

This invention was made with government support under Grant Nos. 4 R33 EB004204-01 and U54 CA119343 awarded by The National Institutes of Health-National Institute of Biomedical Imaging and Bioengineering and the National Cancer Institute. The government has certain rights in the invention.

TECHNICAL FIELD

The subject matter disclosed herein relates generally to systems and methods for x-ray imaging. More particularly, the subject matter disclosed herein relates to x-ray imaging of dynamic objects with high temporal resolution and fast imaging speed.

BACKGROUND

In many applications of x-ray imaging such as medical imaging and industrial inspections, it is often desirable to obtain dynamic (i.e., moving) images of objects in different dynamic states (i.e., phases) with high temporary resolution. For example, the object may be undergoing motions, such as the cyclic motions involved in human respiration and cardiac activities. Unfortunately, motion-induced blurs can degrade the image quality, resulting in significantly deteriorated imaging resolution. The current practice of reducing motion blurs is to use fast frame readout from x-ray detectors, or short x-ray exposure from x-ray sources.

Because of technological constrains, however, the frame rate of current x-ray detectors is limited by the speed from detector readout electronics and the x-ray exposure time is limited by the flux from a given x-ray tube. To reduce the imaging blur induced by a cyclic motion, it is common to gate the x-ray exposure and the image acquisition to the cyclic motion. This method can reduce the blur, but it can also significantly increase the imaging time because only one image is taken within a single motion cycle or predetermined motion range.

Accordingly, in all existing methods, the temporal resolution is limited by the pulsing control of the x-ray source and the imaging time is limited by the x-ray detector speed. Advances in this field have yielded devices and methods that can achieve high temporal resolution by using a carbon nanotube (CNT) x-ray source, and multiplexing methods can increase the 3D x-ray imaging speed. Despite these advances, however, it would desirable for a system and method for x-ray imaging of dynamic objects with high temporal resolution and fast imaging speed without using fast x-ray detectors.

SUMMARY

In accordance with this disclosure, systems and methods for x-ray imaging of dynamic objects with high temporal resolution and fast imaging speed are provided. In one aspect, a method of x-ray imaging is provided. The method can include applying a single pulsed x-ray beam to an object to be imaged undergoing cyclic motion, detecting x-ray radiation from the object, generating multiple x-ray images from the x-ray radiation, and demultiplexing the multiple x-ray images to produce an individual phase image. The multiple x-ray images can be acquired at different phases within a single motion cycle or predetermined motion range of the object.

In another aspect, an x-ray imaging system is provided. The x-ray imaging system can include a single-beam x-ray source operable to generate a pulsed x-ray beam for acquiring multiple x-ray images of an object undergoing cyclic motion at different phases within a single motion cycle or predetermined motion range, an x-ray detector, and a controller in communication with the x-ray source and the object.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Multiplexing refers to the simultaneous collection of multiple datasets and has been applied successfully in areas such as telecommunication and analytical instrumentations to increase rates of data acquisition. Although multiplexing using a coded aperture approach has previously been considered for x-ray imaging, using newly developed technology for a carbon-nanotube-based, spatially-distributed multi-beam x-ray source, multiplexing x-ray imaging can be performed with frequency multiplexing, which is disclosed in U.S. Pat. No. 7,245,692 to Lu et al., filed Apr. 25, 2006 and issued Jul. 17, 2007, the disclosure of which is incorporated herein in its entirety. Alternatively, multiplexing x-ray imaging can be performed with spatial binary multiplexing, which is disclosed in U.S. Patent Application Pub. No. 2008/0069420 to Zhang et al., filed May 21, 2007, the disclosure of which is also incorporated herein in its entirety. By simultaneous collection of multiple x-ray images, either multiplexing approach can significantly increase the data collection speed when compared to a conventional sequential imaging mode.

In yet another alternative, the presently-disclosed subject matter provides a novel temporal multiplexing method for dynamic x-ray imaging of an object in cyclic motion. Compared to existing spatial multiplexing methods, the disclosed systems and methods provide equivalent effects in terms of reduction in data collection time, but only a single-beam x-ray source need be used, and multiplexing can be performed through the temporal domain.

In general, the dynamic x-ray imaging of an object motion, such as cyclic motion or a predetermined motion range, requires multiple phase images (i.e., multiple images corresponding to different phases) along the motion cycle or range. In methods according to conventional sequential imaging modes, each phase image is acquired from synchronizing the x-ray exposure and the image acquisition (e.g., a detector readout) with the motion cycle or range. Thus, within one motion cycle or range, only one image can be acquired. Furthermore, when the flux within the short exposure from a given x-ray tube is limited, multiple frames must be acquired at the same phase and averaged for a single phase image to have a sufficient signal-to-noise ratio (SNR). As a result, this practice can lead to prolonged imaging time.

In contrast, one principle of temporal multiplexing as disclosed by the presently-disclosed subject matter is to speed up the multiple-frame-averaged dynamic x-ray imaging process by acquiring multiple images of the object at different phases within a single motion cycle or cycles. Furthermore, this acquisition can be accomplished without the use of a fast x-ray detector by acquiring the multiple images of different phases in a single composite image taken once per motion cycle. The multiple images contained within the composite image can then be deconvoluted by demultiplexing to recover the individual phase images.

Figure 1:
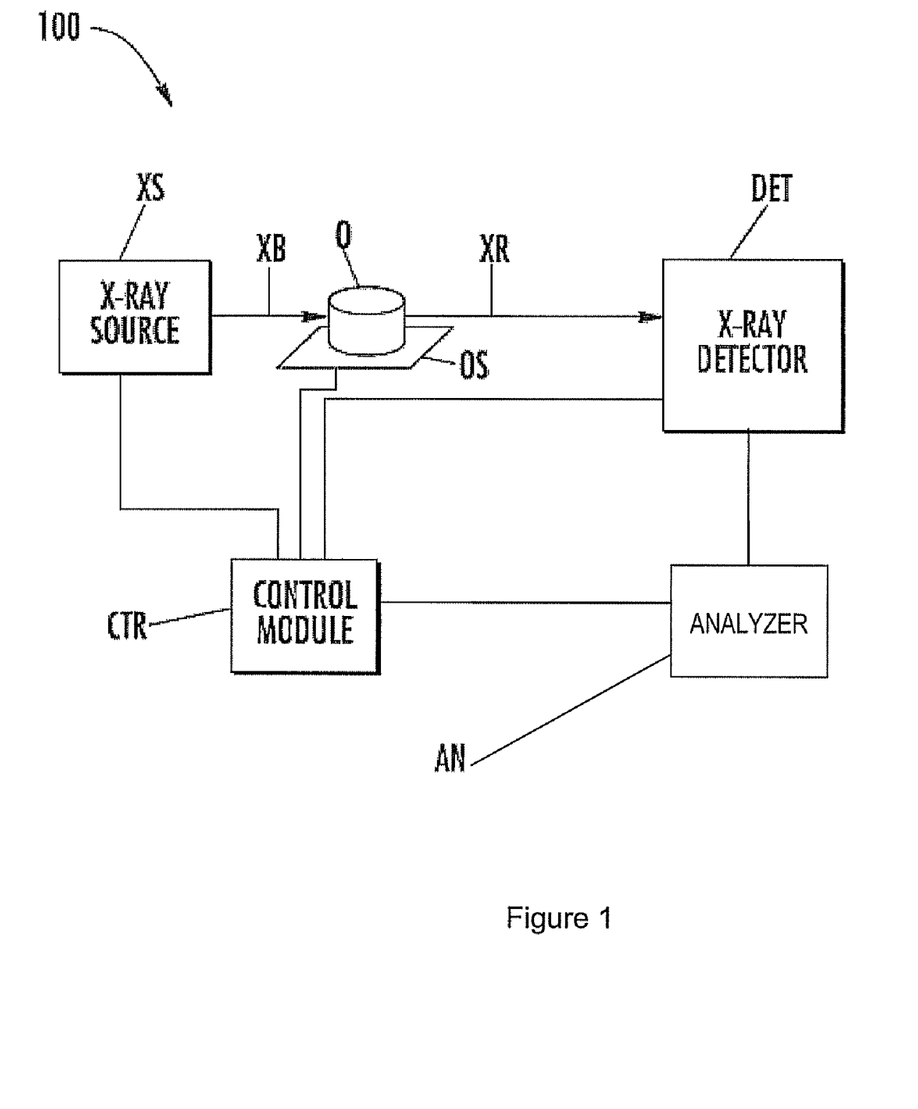
FIG. 1 is a block diagram of an x-ray imaging system according to an embodiment of the presently disclosed subject matter.

For example, the temporal multiplexing concept is illustrated in FIG. 1 for a generalized x-ray imaging system, generally designated 100, consisting of a single-beam x-ray source XS operable to generate an x-ray beam XB that can be pulsed, a digital area detector DET operable to detect x-ray radiation XR, an object O undergoing cyclic motion, and an analyzer AN for imaging object O. As used herein, the term "cyclic" can refer to a motion profile that is repeatable but not necessarily periodic, such as the contraction/expansion of a human heart for example. Object O can be positioned on an object stage OS in the path of x-ray beam XB for intercepting at least a portion of x-ray beam XB, and system 100 can further include a control module CTR in communication with one or more of x-ray source XS, object O, and x-ray detector DET.

X-ray source XS can be any suitable device operable to generate an x-ray beam for imaging an object. An exemplary x-ray source can be a field emission x-ray source, such as those described in U.S. Pat. No. 6,553,096 to Zhou et al., filed Oct. 6, 2000 and issued Apr. 22, 2003; U.S. Pat. No. 6,850, 595 to Zhou et al., file Dec. 4, 2002 and issued Feb. 1, 2005; and U.S. Pat. No. 6,876,724 to Zhou et al., filed Jan. 22, 2002 and issued Apr. 5, 2005, the disclosures of which are incorporated by reference herein. It is to be understood, however, that the systems and methods of x-ray imaging disclosed herein are not limited to any particular type or configuration of x-ray source. Rather, the present systems and methods can be implemented using any of a variety of x-ray sources capable of generating a pulsed x-ray beam.

Figure 2:
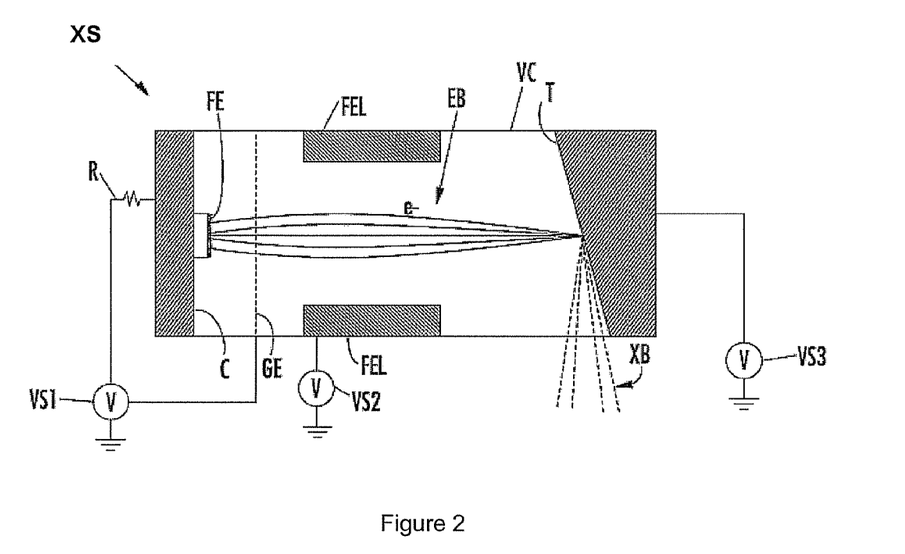
FIG. 2 is a schematic view of an x-ray source for use with an x-ray imaging system according to an embodiment of the presently disclosed subject matter.

In one particular configuration illustrated in FIG. 2, x-ray source XS can be a field emission x-ray source including an electron field emitter FE (also referred to herein as a "pixel") for emitting electrons. Electron field emitter FE can comprise one or more carbon nanotubes and/or other suitable electron field emission materials. Exemplary electron field emission materials can include nanotubes, nanorods. Spindt tips, and nanoparticles of diamond. Carbon nanotubes are typically nano-structured or nanostructure material such as nanoparticles with particle sizes less than 100 nm. Electron field emitter FE can be coupled to a surface of a cathode C, conductive or contact line, or other suitable conductive material for receiving current.

Electron field emitter FE can be controlled by a controller (such as control module CTR shown in FIG. 1) to emit electrons for producing an electron beam EB. In one embodiment, a controller can control a voltage source VS1 to apply a voltage between electron field emitter FE and a gate electrode GE to generate an electric field for extracting electrons from electron field emitter FE. The applied voltage can be pulsed for generating a pulsed electron beam EB. Thus, the frequency of x-ray beam XB can be controlled by the frequency of the applied extraction electric field.

Electron field emitter FE can be oriented such that extracted electrons are directed towards an anode target structure T. Target structure T can produce an x-ray beam XB of a desired wavelength upon bombardment by electron beam EB. X-ray source XS can include a focusing electrode FEL for focusing electrons extracted from electron field emitters FE on target structure T and thus reducing the size of electron beam EB. Focusing electrode FEL can be controlled by application of voltage to focusing electrode FEL by voltage source VS2. A voltage source VS3 can apply a voltage between gate electrode GE and target structure T for accelerating electrons emitted by field emitters FE towards target structure T.

A vacuum chamber VC can include a sealed interior for containing electron field emitter FE and gate electrode GE. The interior of vacuum chamber VC can be evacuated to achieve a desired interior pressure. An exemplary interior pressure of vacuum chamber VC can be about $10^{-7}$ Torr. Electron beam EB can travel from the interior of vacuum chamber VC to its exterior through an electron permeable portion or window.

Referring again to system 100 shown in FIG. 1, the detected x-ray radiation XR can include the portion of x-ray beam XB passing through object O and/or past object O. X-ray radiation XR can also include noise generated by imaging objects, detector DET, electronic circuits, or various other sources. Further, x-ray detector DET can generate x-ray data based on x-ray radiation XR. X-ray detector DET can be any suitable device operable to detect x-ray radiation. In one example, x-ray detector DET can be a high-frame-rate digital detector. In another example, x-ray detector DET can be one or more Si—PIN photodiode x-ray detectors. Examples of digital x-ray detectors include, but are not limited to, charge-coupled device (CCD) area detectors, amorphous selenium (a-Se) area detectors, amorphous silicon (a-Si) area detectors, and arrays of Si—PIN photodiode x-ray detectors.

X-ray source XS can be programmed so that the x-ray exposure can be synchronized with the detector readout and the motion of object O. To reduce the imaging blur from the cyclic motion, the x-ray exposure can be substantially shorter than the detector integration time. With this short exposure, the x-ray flux from x-ray source XS can be so limited that multiple frames are required for dynamic x-ray imaging of object O in sequential imaging mode.

Using temporal multiplexing according to the present systems and methods, the multiple frames can each capture more than just a single phase image. In particular, X-ray source XS can provide X-ray radiation XR in the form of a sequenced combination of X-ray pulses that are all transmitted through object O and received at detector DET within a single detection cycle of X-ray detector DET. In other words, although X-ray radiation XR can comprise multiple pulses that are separated in time, all of the pulses are received at detector DET as a single "detection" as if the temporally spaced pulses were received concurrently. In this way, although detector DET need only be fast enough for a single image to be generated each motion cycle of object O, that single image can be a multiplexed composite image contained multiple phase images. The composite image can be later demultiplexed to recover the individual phase images. Thus, even though multiple frames may be required to achieve sufficient signal-to-noise ratio, those multiple frames can acquire image data for multiple phase images, thereby reducing the imaging time while maintaining high temporal resolution.

Specifically, to image an object in N phases with temporal multiplexing, the first step can be to construct a multiplexing matrix. Similar to spatial multiplexing, there are many possible ways of achieving multiplexing. For example, the Hadamard binary matrix can be used, although it should be understood that any multiplexing matrix capable of being inverted can be applied. A second step can be to acquire N composite x-ray frames, each composite frame being triggered by the signal synchronized to the beginning of a motion cycle or range and exposed by an x-ray pulse sequence defined by a row of the Hadamard multiplexing matrix. After all composite images are acquired, demultiplexing can be performed by applying inverse Hadamard matrix to recover the x-ray images corresponding to the N phases of the motion cycle or range.

Figure 3:
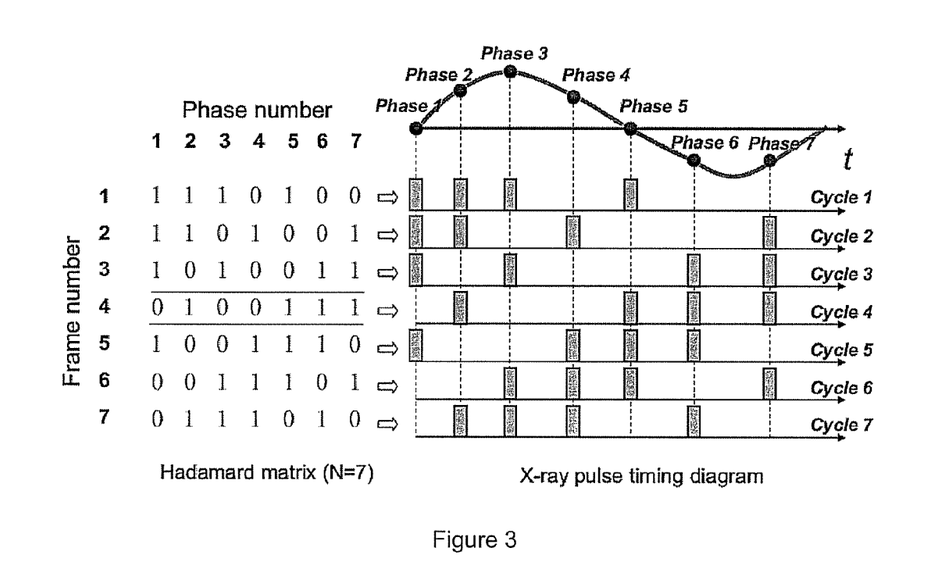
FIG. 3 is a multiplexing matrix and a related x-ray pulse timing diagram according to an embodiment of the presently disclosed subject matter.

By way of specific example, for N having a value of 7, FIG. 3 shows the seven phases along one motion cycle or predetermined motion range, the multiplexing matrix, and the corresponding x-ray pulse timing diagram. The columns of the matrix can correspond to phases, and the rows of the matrix can correspond to output recording frames (i.e., the composite frames). In a single row of the matrix, a value of "one" in a particular column can indicate that the x-ray pulse corresponding to that phase is on for that composite frame. Conversely, a value of "zero" can indicate that the x-ray pulse corresponding to that phase is off for a given composite frame. Each of the seven composite frames can be exposed by four x-ray pulses according to the corresponding row of the Hadamard matrix. From those seven composite images, the seven phase images corresponding to the seven phases of the motion cycle or range can be recovered through demultiplexing. It should be noted that the temporal resolution of the imaging method can be determined by the individual x-ray pulse width, and it is not necessary for all pulses to have the same pulse width, but it can be helpful for the pulse width to be the same for a given phase of cyclic motion. For example, when applying temporal multiplexing to objects that have complex cyclic motion, different phases can have different motion speeds (e.g., contraction and expansion of a heart and lung). In these situations, a higher temporal resolution can limit the motion blur during phases having a higher motion speed. In this regard, the flexibility in temporal multiplexing to choose different x-ray pulse widths for different phases of a complex cyclic motion can lead to better handling of motion blur, thereby resulting in sharper imaging quality.

Figure 4:
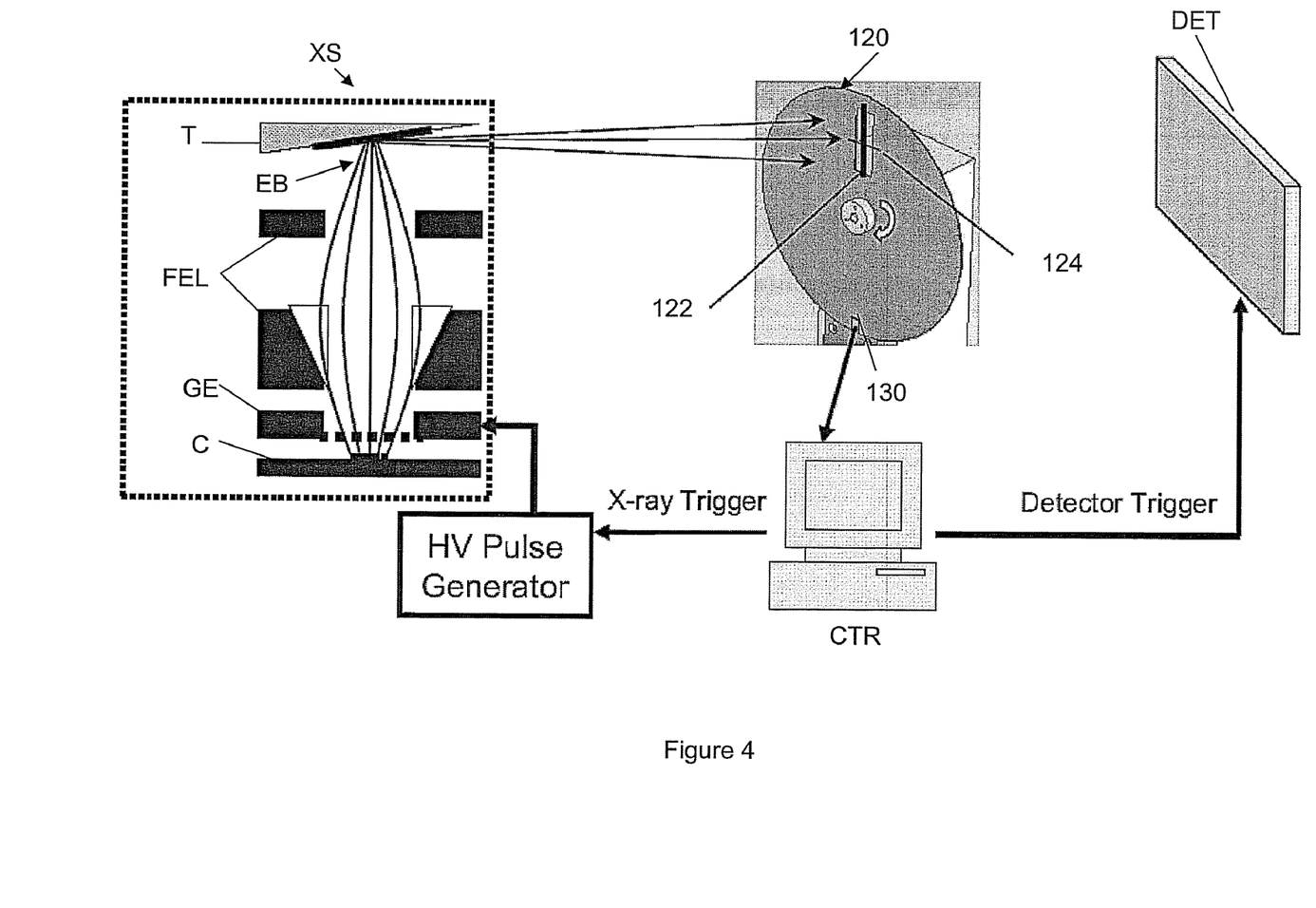
FIG. 4 is a block diagram of a test setup for an x-ray imaging system according to an embodiment of the presently disclosed subject matter.

In one particular arrangement, temporal multiplexing can be applied to the dynamic x-ray imaging of a mechanical rotating object with a CNT-based x-ray source XS and a flat panel x-ray detector DET, which is illustrated in FIG. 4. A CNT x-ray source can advantageously be used in this arrangement because of its flexibility in electronic switching. Any other suitable type of x-ray source with easy programmable switching mechanisms can be used. For this configuration, x-ray source XS can be operated at 45 kVp, 0.9 mA peak tube current, and a 100 μm effective focal spot size. X-ray detector DET can be a complementary metal-oxide semiconducting (CMOS) flat-panel sensor with a CsI scintillator plate directly deposited on a photo diode array (e.g., a Model C7940DK-02 flat-panel sensor produced by Hamamatsu Photonics). For instance, the sensor can have 2 k 2 k pixels with a nominal pixel size of about 50 μm.

For ease of explanation, the rotating object can be modeled using a wire phantom that can be made of an aluminum disk 120 (e.g., about 1 mm thick), which can be driven by a stable rotor. Disk 120 can have a radius of about 115 mm, with a rectangular cut-out section near its edge (e.g., a 20 mm 60 mm section). A first tungsten wire 122 (e.g., about 1 mm in diameter) can be mounted radially across this cut-out section. A second tungsten wire 124 (e.g., about 50 μm) can be positioned perpendicular to first wire 122 at its mid-length. A notch (e.g., about 3 mm 5 mm) can be formed on the disk's edge opposite to the first wire, the notch serving as an optoswitch trigger point 130. The phantom can be placed close to detector DET so that the magnification is approximately one. The phantom can be rotated at a speed such that the linear velocity of first wire 122 is about 6.0 cm/s at a bottom point and about 7.5 cm/s at a top point for the part of first wire 122 within the cut-out section. When wires 122 and 124 pass through the detector field of view (FOV), optoswitch 130 coupled below the edge of disk 120 can generate a transistor-transistor logic (TTL) pulse, which can be used to trigger the x-ray pulse sequences and the composite images acquisition via control module CTR (e.g., a computer).

The object (e.g., the rotating wire phantom disclosed above) can be imaged with seven-phase temporal multiplexing. All seven phases can be equally spaced to each other, with the first phase triggered by optoswitch trigger 130 without delay. Each phase, and therefore the corresponding x-ray pulse (τ), can have a short predetermined duration (e.g., about 10 ms). The delay between two neighboring phases/pulses can be equal to this duration. Therefore, the seven phases/pulses can be separated from optoswitch trigger 130 by multiples of the predetermined duration (e.g., about 0 ms, 20 ms, 40 ms, 60 ms, 80 ms, 100 ms, and 120 ms, respectively). Referring again to FIG. 3, the multiplexing matrix is shown. As discussed above, in a single row of the matrix, a value of "one" in a particular column can indicate that an x-ray pulse corresponding to that phase is on for that composite frame. Likewise, a value of "zero" can indicate the x-ray pulse corresponding to that phase is off for a given composite frame. After acquiring the seven composite images over seven motion cycles or ranges, demultiplexing can be applied on the composite images to recover the seven demultiplexed phase images.

Figure 5A:
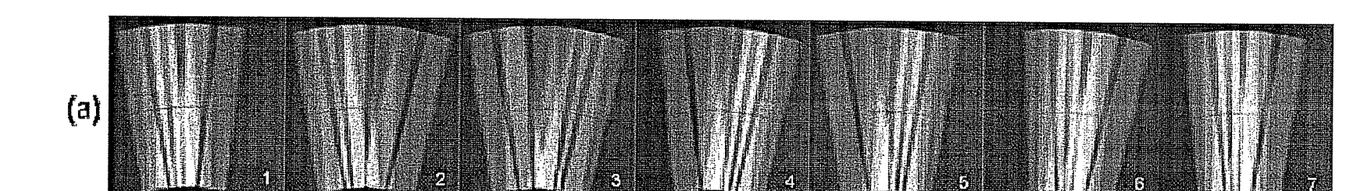
FIG. 5A is a series of seven composite images of a dynamic object acquired by an x-ray imaging system according to an embodiment of the presently disclosed subject matter.
Figure 5B:
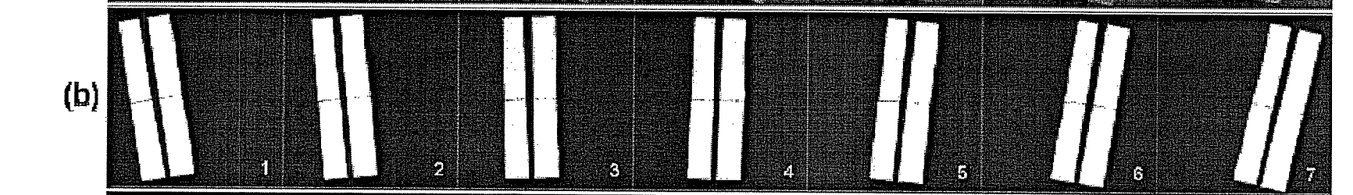
FIG. 5B is a series of seven demultiplexed phase images produced from the seven composite images shown in FIG. 5A.

FIG. 5A shows the seven composite images. As can be seen in FIG. 5A, there can be a good correlation between the composite images and the x-ray pulse sequences. As wires 122 and 124 moved across the detector FOV from left to right, four out of seven phases of this motion were captured in a composite image by the corresponding four x-ray pulses. A phase was recorded if and only if the corresponding x-ray pulse for that phase was on for that composite image. By demultiplexing the composite images pixel by pixel, clear images for the seven phases can be extracted. Examples of the demultiplexed images are shown in FIG. 5B.

Figure 5C:
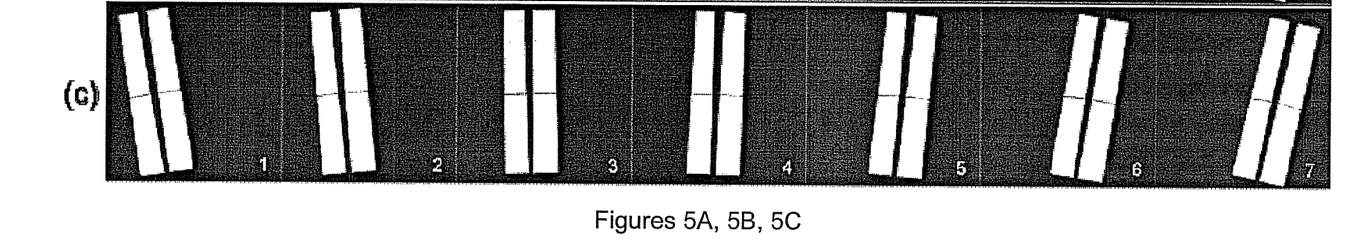
FIG. 5C is a series of seven sequential phase images produced according to a sequential imaging method previously known in the art.

To assess the quality of the seven demultiplexed phase images, the same seven phase images can be obtained in the sequential imaging mode. At each phase, four x-ray images can be acquired over four motion cycles or predetermined motion ranges at the same imaging conditions (e.g., voltage, current, detector configuration, and geometry), except that each image can be exposed by a single x-ray pulse (e.g., about 10 ms). The four x-ray images can be averaged to give the sequential image for that phase. Thus, the doses for the sequential images and the demultiplexed images can be the same, except that the sequential images can take four times longer to obtain. The seven sequential phase images are shown in FIG. 5C. The two sets of images in FIGS. 5B and 5C have good phase co-registration, which indicates no loss of temporal resolution.

Compared to sequential imaging, temporal multiplexing can enable imaging system 100 to squeeze more x-ray photons in a motion cycle or predetermined motion range without loss of temporal resolution, thereby reducing the imaging time. In general, given a sequential dynamic imaging of an object in cyclic motion where (2N−1) phases are required and each sequential phase image is averaged from N frames/cycles exposed by a single x-ray pulse of a given width t, temporal multiplexing of dimension (2N−1) can reduce the total number of motion cycles or ranges required for image acquisition by a factor of N without loss of the temporal resolution t. This reduction in data collection time becomes particularly significant when N is large.

In summary, the present subject matter provides systems and methods for reducing the imaging time for dynamic x-ray imaging of an object with cyclic motion by using temporal multiplexing x-ray imaging (TMX). Compared to sequential imaging. TMX can achieve high temporal resolution of dynamics object in multiple phases with imaging time substantially reduced. Temporal multiplexing x-ray imaging can thus be applied to a wide variety of applications, including biomedical imaging and industrial non-destructive testing.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A method of temporal multiplexing x-ray imaging of a dynamic object, the method comprising:
   (a) passing a sequenced combination of x-ray beam pulses through an object undergoing cyclic motion, each of the x-ray beam pulses corresponding to a temporal phase of the cyclic motion;
   (b) detecting the x-ray beam pulses;
   (c) generating a multiplexed x-ray image of the combination of x-ray beam pulses passed through the object during a single cycle of the cyclic motion; and
   (d) demultiplexing the multiplexed x-ray image to generate an x-ray image of the object for each temporal phase.

2. The method of claim 1, comprising generating a plurality of additional multiplexed x-ray images of each combination of x-ray beam pulses passed through the object during further cycles of the cyclic motion.

3. The method of claim 1, wherein passing a sequenced combination of x-ray beam pulses comprises using a different sequences of x-ray beam pulses for each cycle of the cyclic motion.

4. The method of claim 3, wherein the different sequences of x-ray beam pulses are selected based on a Hadamard binary matrix.

5. The method of claim 1, wherein the object undergoes non periodic cyclic motion.

6. The method of claim 1, wherein passing a sequenced combination of x-ray beam pulses comprises emitting the x-ray beam pulses from a carbon-nanotube-based field emission x-ray source.

7. The method of claim 1, wherein the x-ray beam pulses each have an x-ray exposure time that is shorter than a single cycle integration time for detecting the x-ray beam pulses.

8. The method of claim 1, wherein passing a sequenced combination of x-ray beam pulses through an object comprises synchronizing the x-ray beam pulses with the motion of the object.

9. The method of claim 1, wherein demultiplexing the multiplexed x-ray image comprises applying an inverse Hadamard binary matrix.

10. A method of temporal multiplexing x-ray imaging of a dynamic object, the method comprising:
    (a) passing a sequenced combination of x-ray beam pulses through an object undergoing cyclic motion, each of the x-ray beam pulses corresponding to a temporal phase of the cyclic motion;
    (b) detecting the x-ray beam pulses;
    (c) generating a plurality of multiplexed x-ray images of the combination of x-ray beam pulses passed through the object, each of the plurality of multiplexed x-ray images being generated from the combination of x-ray beam pulses passed through the object during different cycles of the cyclic motion; and
    (d) demultiplexing the plurality of multiplexed x-ray images to generate an x-ray image of the object for each temporal phase.

11. The method of claim 10, further comprising combining each x-ray image corresponding to a given temporal phase.

12. An x-ray imaging system comprising:
    a single-beam x-ray source operable for passing a pulsed x-ray beam through an object undergoing cyclic motion;
    an x-ray detector;
    a controller in communication with the x-ray source and the object and being operable to generate a sequenced combination of x-ray beam pulses from the x-ray source and acquire one or more multiplexed x-ray images of the object undergoing cyclic motion, each of the x-ray beam pulses corresponding to a temporal phase of the cyclic motion;
    an imaging processing unit operable to de-multiplex the multiplexed images to obtain images of the object at different temporal phases of the cyclic motion.

13. The system of claim 12, wherein the x-ray source comprises a field emission x-ray source.

14. The system of claim 12, wherein the field emission x-ray source comprises a carbon-nanotube-based x-ray source.

15. The system of claim 12, wherein the digital area detector comprises a flat panel x-ray detector.

16. The system of claim 12, wherein an x-ray exposure time of the x-ray source is shorter than a detector integration time of the x-ray detector.

17. The system of claim 12, wherein the controller is in communication with the detector.

* * * * *